United States Patent
Hirabayashi

(10) Patent No.: US 8,058,760 B2
(45) Date of Patent: Nov. 15, 2011

(54) MAGNETIC HOLDING SPRING FOR MAGNETO FIELD TYPE MOTOR AND MANUFACTURING THEREOF

(75) Inventor: Takashi Hirabayashi, Chita-gun (JP)

(73) Assignee: Denso Corporation, Kariya (JP)

( * ) Notice: Subject to any disclaimer, the term of this patent is extended or adjusted under 35 U.S.C. 154(b) by 197 days.

(21) Appl. No.: 12/461,119

(22) Filed: Jul. 31, 2009

(65) Prior Publication Data

US 2010/0026125 A1   Feb. 4, 2010

(30) Foreign Application Priority Data

Aug. 1, 2008  (JP) ................. 2008-199535

(51) Int. Cl.
*H02K 21/26* (2006.01)
*H02K 21/38* (2006.01)
*H02K 23/04* (2006.01)
*H02K 21/12* (2006.01)

(52) U.S. Cl. ......... 310/154.15; 310/154.14; 310/154.18; 310/254.1; 310/154.03; 310/156.16; 310/156.17

(58) Field of Classification Search .......... 310/154.03–154.09, 154.14–154.19, 310/156.16–156.19, 254.1; 29/596, 607, 29/609; *H02K 1/17, 21/26, 21/38, 23/04*
See application file for complete search history.

(56) References Cited

U.S. PATENT DOCUMENTS

| | | | | |
|---|---|---|---|---|
| 4,580,072 A | * | 4/1986 | Morishita | 310/154.15 |
| 4,745,319 A | * | 5/1988 | Tomite et al. | 310/154.26 |
| 6,262,380 B1 | * | 7/2001 | Sasaki et al. | 200/6 BB |
| 6,376,956 B1 | * | 4/2002 | Hosoya | 310/154.17 |
| 6,465,925 B2 | * | 10/2002 | Kako et al. | 310/156.16 |
| 7,679,250 B2 | * | 3/2010 | De Godoy et al. | 310/154.14 |
| 2002/0063485 A1 | * | 5/2002 | Lee et al. | 310/154.15 |
| 2006/0091752 A1 | * | 5/2006 | Adaniya et al. | 310/156.16 |
| 2007/0126301 A1 | * | 6/2007 | De Godoy et al. | 310/154.14 |
| 2007/0126302 A1 | * | 6/2007 | Murata | 310/154.15 |
| 2008/0036326 A1 | * | 2/2008 | Kito | 310/154.14 |
| 2008/0185929 A1 | * | 8/2008 | Hirabayashi | 310/154.14 |
| 2010/0026125 A1 | * | 2/2010 | Hirabayashi | 310/156.16 |

FOREIGN PATENT DOCUMENTS

| | | |
|---|---|---|
| JP | 03273840 | * 12/1991 |
| JP | A-9-168245 | 6/1997 |
| JP | A-2008-193758 | 8/2008 |

* cited by examiner

*Primary Examiner* — Quyen Leung
*Assistant Examiner* — Terrance Kenerly
(74) *Attorney, Agent, or Firm* — Oliff & Berridge, PLC

(57) ABSTRACT

When the magnet holding spring is in the deployed state of the plate-like shape, the auxiliary pole is beforehand fixed to one of the side-plates, then the magnet holding spring is bent into a "]"-like sectional shape. As a result, the magnet holding spring and the auxiliary pole that are assembled integrally constitute the sub-assy. Convex parts are formed on the auxiliary pole. The auxiliary pole is fixed to one of the side-plates by press fitting the convex parts to the fitting holes formed on one of the side-plates. The auxiliary pole is laid on one of the side-plates in the direction of a plate thickness for positioning before forming the convex parts on the auxiliary pole. In the positioned state here, by embossing the auxiliary pole, the convex parts are formed on the auxiliary pole, and at the same time, the convex parts are press fit into the fitting holes thus the auxiliary pole is fixed to one of the side-plates.

5 Claims, 7 Drawing Sheets

( SDECTION B-B )

(SECTION A-A)

MAGNETIC HOLDING SPRING FOR MAGNETO FIELD TYPE MOTOR AND MANUFACTURING THEREOF

CROSS-REFERENCE TO RELATED APPLICATION

This application is based on and claims the benefit of priority from earlier Japanese Patent Application No. 2008-199535 filed Aug. 1, 2008, the contents of which are incorporated herein by reference.

BACKGROUND OF THE INVENTION

1. Technical Field of the Invention

The present invention relates to a magneto field type motor and a method of manufacturing it. The motor has an auxiliary pole made of a magnetic material that is arranged to an increasing magnetic flux side of a main magnetic pole, which is made of a permanent magnet, while the main magnetic pole and the auxiliary pole are fixed to a yoke via a magnet holding spring.

2. Description of the Related Art

Conventionally, a magneto field type motor fixed to an inner circumference of a yoke by using a permanent magnet as a main magnetic pole is known. According to this magneto field type motor, referring to Japanese Patent Application Laid-Open Publication No. 9-168245, for example, the revolving speed in a low current region can be raised without reducing the torque in a high current region by arranging an auxiliary pole that is made of a magnetic material (iron, for example) adjoining to a increasing magnetic flux side of the main magnetic pole. Consequently, the starting ability at normal temperatures can be raised.

In addition, with the above-mentioned conventional technology, a magnet holding spring having a "]"-like sectional shape (i.e. like three sides of a rectangle, or nearly U-shape in cross section) opened to the center of the yoke is used as a means for fixing the main magnetic pole and the auxiliary pole to the inner circumference of the yoke.

The method of fixing the main magnetic pole and the auxiliary pole to the inner circumference of the yoke using the magnet holding spring is explained below.

First, after fixing the magnet holding spring in the predetermined position of the circumference in the yoke, a magneto insertion space is secured with a jig among the magnet holding springs that adjoin each other around the circumference of the inner peripheral wall of the yoke.

Then, attachment of the main magnetic pole and the auxiliary pole is completed by inserting the main magnetic pole and the auxiliary pole in the magneto insertion space in an axial direction simultaneously, and pushing out the jig from the inside of the yoke synchronizing with an insertion operation of the main magnetic pole and the auxiliary pole.

By the way, since the main magnetic pole is magnetized when all the main magnetic poles and auxiliary poles are attached to the yoke, the auxiliary pole cannot be magnetically attached to the main magnetic pole when the main magnetic pole and the auxiliary pole are inserted in the magneto insertion space in the axial direction.

For this reason, a certain device is needed so that the main magnetic pole and the auxiliary pole do not come apart at the time of assembling.

SUMMARY OF THE INVENTION

The present invention has been made in light of the problem explained above, and has as its object to provide a magneto field type motor and the method of manufacturing it that improves productivity and lowers the cost by easing the assembly of the auxiliary pole to a magnet holding spring.

In the magneto field type motor according to a first aspect, the magneto field type motor comprises a plurality of main magnetic poles made of permanent magnets that are arranged to the inner circumference of a yoke at equal intervals, a plurality of auxiliary poles made of magnetic materials that are arranged to adjoining increasing magnetic flux sides of the main magnetic poles, and a plurality of magnet holding springs that are arranged between the auxiliary poles and the decreasing magnetic flux sides of the main magnetic poles.

Each magnet holding spring is provided in a "]"-like sectional shape having a back-plate fixed to an inner circumference of the yoke and a pair of side-plates extending in a direction of a center of the yoke from the both sides in a circumferential direction of the back-plate, the main magnetic poles and the auxiliary poles being fixed by being pressed in a circumferential direction by the elasticity of the pair of the side-plates.

In the stage where the magnet holding spring is deployed as a flat plate before the back-plate and the pair of side-plates are bent into the "]"-like sectional shape, the auxiliary pole is attached beforehand to one of the side-plates among the pair of side-plates, then the magnet holding spring is bent into the "]"-like sectional shape, and the magnet holding spring and the auxiliary pole are attached integrally to constitute a sub-assembly.

When one of the side-plates is assembled to the plate-like shape auxiliary pole before the magnet holding spring is bent, since it is not necessary to receive limitations in arrangement of the jig used for integrating the auxiliary pole with the magnet holding spring, and to hold the magnet holding spring in the "]"-like sectional shape, the assembling of the magnet holding spring and the auxiliary pole can be performed easily compared with the case where the auxiliary pole is assembled with the magnet holding spring after bending and processing the magnet holding spring in the "]"-like sectional shape.

The processes of bending the magnet holding spring into the "]"-like sectional shape is possible in a satisfactory manner even when the auxiliary pole is attached to the magnet holding spring. Thereby, the assembling of the auxiliary pole to the magnet holding spring and the bending of the magnet holding spring can be processed continuously on the same manufacturing line, and the sub-assembly can be produced at low cost.

In the magneto field type motor according to a second aspect, the magnet holding spring and the auxiliary pole are attached integrally by press fitting a concave part provided in either one of the side-plate or the auxiliary pole with a convex part provided in the other one of the side-plates or the auxiliary pole to form the sub-assembly.

In a method of manufacturing magneto field type motor according to a first aspect, the method comprises the steps of forming a fitting hole that forms the concave part on one of the side-plates of the magnet holding spring by punching, forming the convex part to the auxiliary pole in the position corresponding to the fitting hole by embossing, and assembling the magnet holding spring and the auxiliary pole integrally by press fitting the convex part into the fitting hole.

In the method of manufacturing magneto field type motor according to a second aspect, the method further comprises the steps of forming the fitting hole beforehand on one of the side-plates before forming the convex part in the auxiliary pole of the magnet holding spring, positioning one of the side-plates provided with the fitting hole and the auxiliary pole by laying the auxiliary pole on one of the side-plates, and forming the convex part to the auxiliary pole and press fitting the convex part to the fitting hole simultaneously by performing the punching process on the auxiliary pole in the state where the auxiliary pole and one of the side-plates are positioned so that the convex part is press fit into the fitting hole while the magnet holding spring and the auxiliary pole are integrally assembled simultaneously.

In the magneto field type motor according to a third aspect, a fixing hole is formed on the back-plate of the magnet holding spring that contacts the inner circumference of the yoke, a projection portion is formed in the inner circumference of the yoke corresponding to the fixing hole, and the sub-assembly is fixed to the yoke by inserting the projection part into the fixing holes and split-and-caulking the projection part along an axial direction.

In the magneto field type motor according to a fourth aspect, when the size of the auxiliary pole in the circumferential direction is set to W, the fixing hole is formed in the position offset just W/2 towards the auxiliary pole side from the center of the back-plates in the circumferential direction.

In the magneto field type motor according to a fifth aspect, a nail-plate portion that regulates position gaps of the main magnetic poles in the axial direction is formed on both ends of the magnet holding spring in the axial direction; and the nail-plate portion is formed only on the side that has the other one of the side-plates among the pair of the side-plates in the circumferential direction of the magnet holding spring.

DETAILED DESCRIPTION OF THE PREFERRED EMBODIMENTS

With reference to the accompanying drawings, hereinafter is described an embodiment of the present invention.

Figure 1:
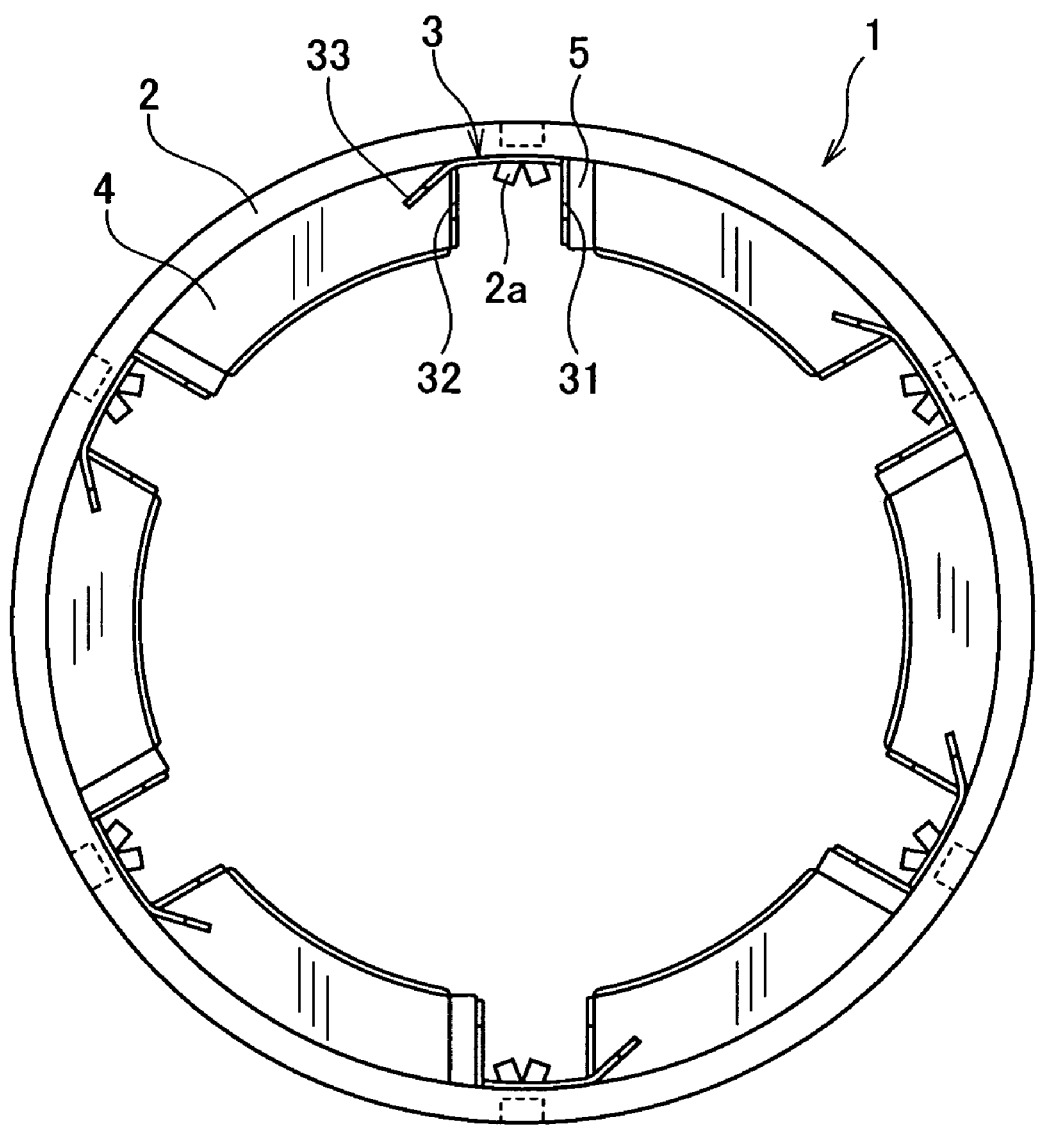
FIG. 1 shows an elevational view of a yoke assembly in an axial direction.
Figure 2:
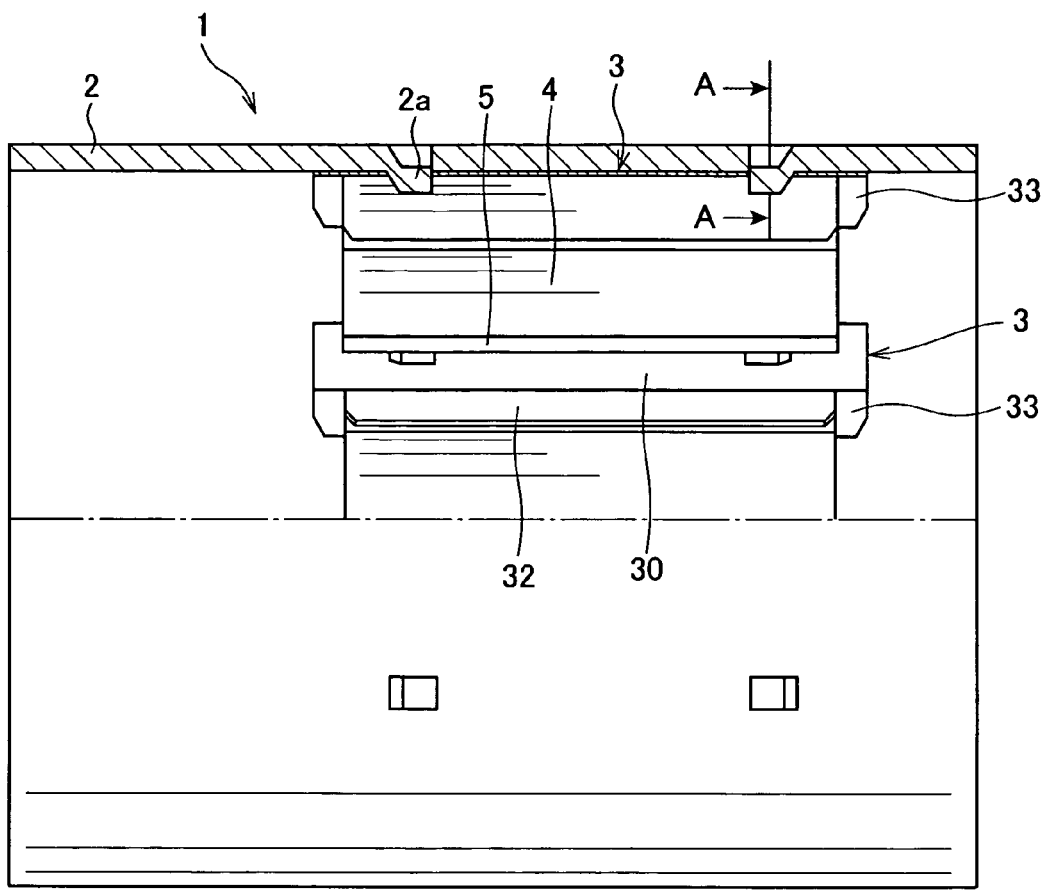
FIG. 2 shows a half-sectional view of the yoke assembly.

FIG. 1 shows an elevational view of a yoke assembly 1 in an axial direction used for a starter motor (magneto field type motor of a present invention) for starting an automobile engine into operation, and FIG. 2 shows a half-sectional view of the yoke assembly 1.

The yoke assembly 1 comprises a cylindrical yoke 2, a plurality of magnet holding springs 3 fixed to an inner circumference of the yoke 2 at equal intervals, a plurality of main magnetic poles 4 fixed to the inner circumference of the yoke 2 via the magnet holding springs 3, and a plurality of auxiliary poles 5 arranged in contact with increasing magnetic flux sides of the main magnetic poles 4.

The main magnetic poles 4 and the auxiliary poles 5 are fixed by being pressed in a circumferential direction by the elasticity of the magnet holding springs 3.

An armature (not shown) is accommodated in the inner circumference of the yoke assembly 1 coaxially.

Inside the yoke 2, as shown in FIG. 2, there are provided a plurality of projection portions 2a for fixing the magnet holding springs 3.

These projection parts 2a are formed in the shape of a rectangle by press work. Two projection parts 2a are provided for each magnet holding spring 3 in the longitudinal direction of the yoke 2 (in the axial direction).

Figure 3:
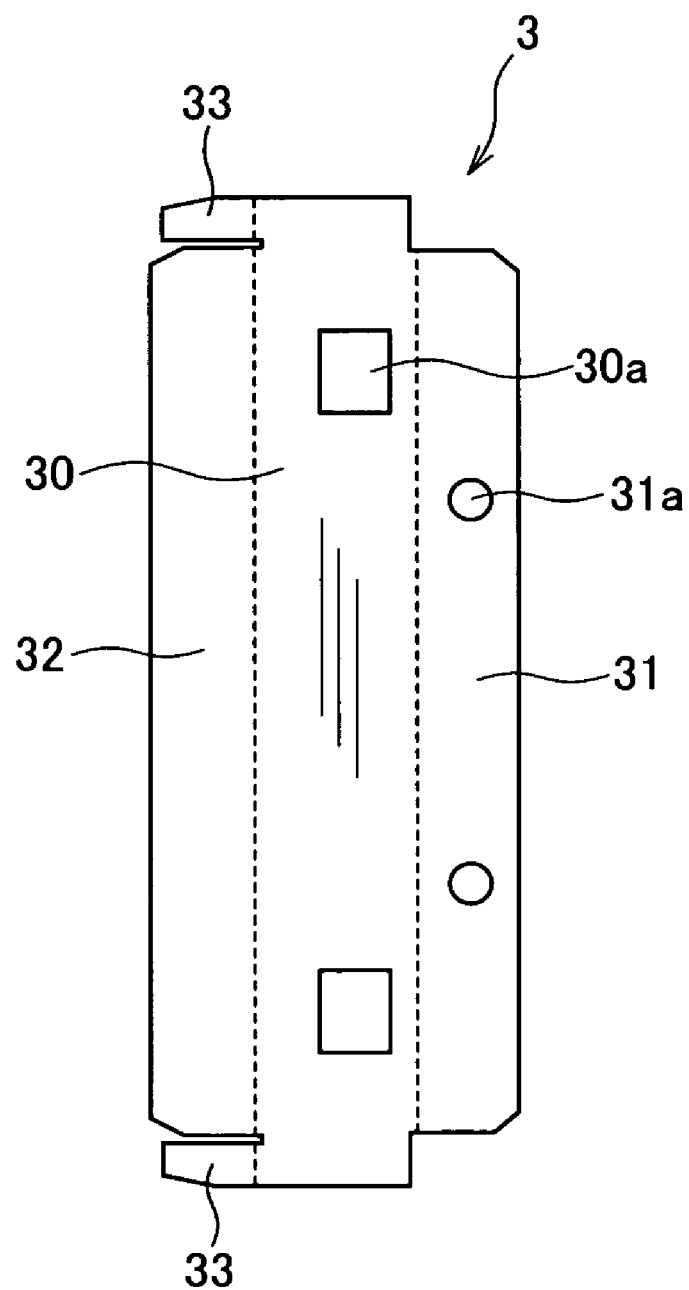
FIG. 3 shows a deployed view of a magnet holding spring.

As shown in FIG. 3 for instance, the magnet holding spring 3 is formed in a "]"-like sectional shape (i.e. like three sides of a rectangle, or nearly U-shape in cross section) by bending the both sides along with bending lines, shown with dashed lines in the figure, after piercing a stainless steel plate by press cutting in a predetermined shape.

It should be appreciated that FIG. 3 is a deployed plane view showing the state before bending the magnet holding spring 3 into the "]"-like sectional shape.

Each magnet holding spring 3 comprises a back-plate 30, a pair of side-plates 31 and 32, and a pair of nail-plate portions 33. The back-plates 30 are arranged in accordance with the inner circumference of the yoke 2. The side-plates 31 and 32 extend in the direction of the center of the yoke 2 from both sides in a circumferential direction of the back-plates 30. The nail-plate portion 33 regulates position gaps of the main magnetic poles 4 in the axial direction. The magnet holding springs 3 are fixed to the inner circumference of the yoke 2 and are opened to the center of the yoke 2.

Two fixing holes 30a having shapes of a rectangle, which the projection parts 2a provided on the yoke 2 fit into, are formed on the back-plate 30.

Figure 4A:
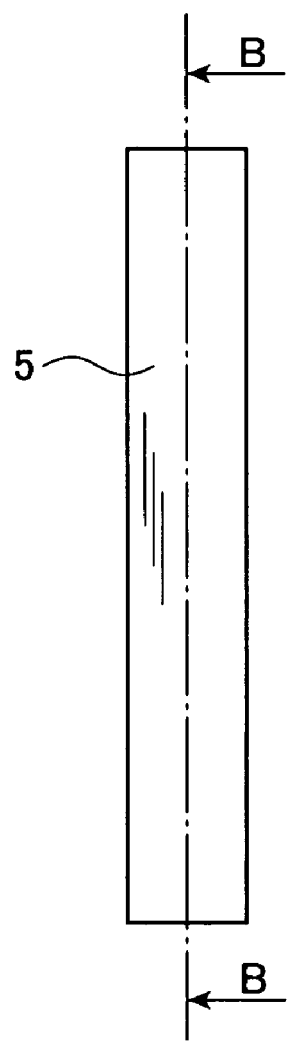
FIG. 4A shows a plane view of an auxiliary pole.

Note that fixing holes 30a are formed at a position offset just W/2 towards the auxiliary pole 5 side (right-hand side in FIG. 3) from the center of the back-plate 30 (center of two bending lines shown in FIG. 3) in the circumferential direction when the size of the auxiliary pole 5 in the circumferential direction is W (refer to FIG. 4).

The pair of the side-plates 31 and 32 is bent a little less than 90 degrees to the back-plate 30 along with the above-mentioned bending line, respectively.

Two circular fitting holes 31a are formed, by punching for example, in one of the side-plates 31 among the pair of the side-plates 31 and 32.

The pair of the nail-plate portions 33 is formed, as shown in FIG. 1, only on the side that has the other one of the side-plates 32 among the pair of the side-plates 31 and 32 in the circumferential direction of the magnet holding spring 3.

The main magnetic poles 4 are formed with a permanent magnet, and are provided in an arc form along with the inner circumference of the yoke 2.

The length in the axial direction and the height (size in the radial direction) of the main magnetic pole 4 are set to approximately the same sizes as the pair of the side-plates 31 and 32 of the magnet holding spring 3.

Figure 4B:
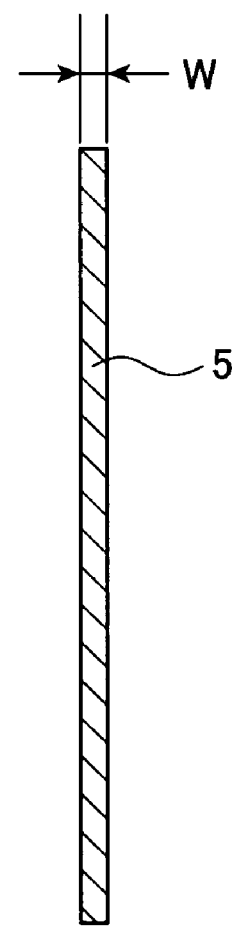
FIG. 4B shows a sectional view of the auxiliary pole.

The auxiliary pole 5 is formed of an iron plate with a thickness of about several millimeters (refer to FIG. 4B).

The length in the axial direction and the height of the auxiliary pole 5 are set to approximately the same sizes as the length in the axial direction and the height of the main magnetic pole 4.

Figure 5A:
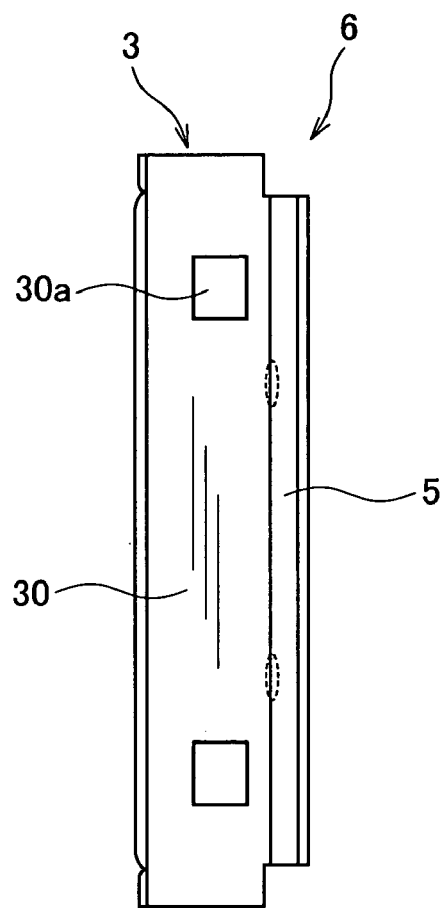
FIG. 5A shows a plane view of a sub-assembly.
Figure 5B:
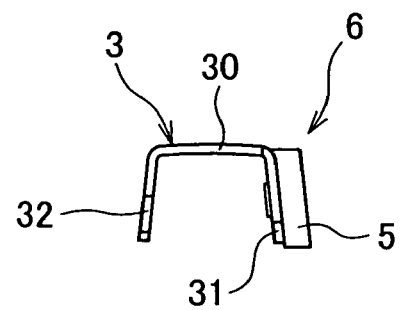
FIG. 5B shows an elevational view of the sub-assembly.

As shown in FIG. 5, the auxiliary pole 5 is fixed to one of the side-plates 31 of the magnet holding spring 3 beforehand, and constituted as a magnet holding spring sub-assembly (shortened to a sub-assy 6 hereafter).

Next, the above-mentioned sub-assy 6 is described.

As shown in FIG. 3, when the magnet holding spring 3 is in the deployed state of the plate-like shape, the auxiliary pole 5 is beforehand fixed to one of the side-plates 31, then the magnet holding spring 3 is bent into the "]"-like sectional shape. As a result, the magnet holding spring 3 and the auxiliary pole 5 that are assembled integrally constitute the sub-assy 6.

Convex parts 5a (referring to FIGS. 5A, 5B, 6A and 6B) are formed on the auxiliary pole 5. The auxiliary pole 5 is fixed to one of the side-plates 31 by press fitting the convex parts 5a to the fitting holes 31a formed on one of the side-plates 31.

Figure 6A:
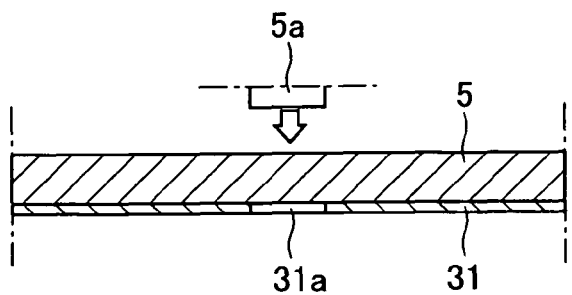
FIGS. 6A and 6B show sectional views showing a procedure of fixing the auxiliary pole to one of side-plates.
Figure 6B:
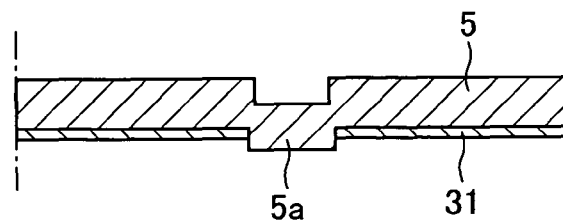

As shown in FIG. 6A, the auxiliary pole 5 is laid on one of the side-plates 31 which has fitting holes 31a formed beforehand in the direction of the plate thickness for positioning before forming the convex parts 5a on the auxiliary pole 5. When so positioned, by embossing to the auxiliary pole 5, as shown in FIG. 6B, the convex parts 5a are formed on the auxiliary pole 5, at the same time, the convex parts 5a are press fit into the fitting holes 31a thus the auxiliary pole 5 is fixed to one of the side-plates 31.

That is, formation of the convex parts 5a to the auxiliary pole 5 and press fitting of the convex parts 5a to the fitting holes 31a are performed simultaneously.

Next, the method of assembling the sub-assy 6 and the main magnetic pole 4 to the yoke 2 is explained.

First, before attaching the main magnetic pole 4 to the yoke 2, the sub-assy 6 is fixed to the yoke 2.

Figure 7:
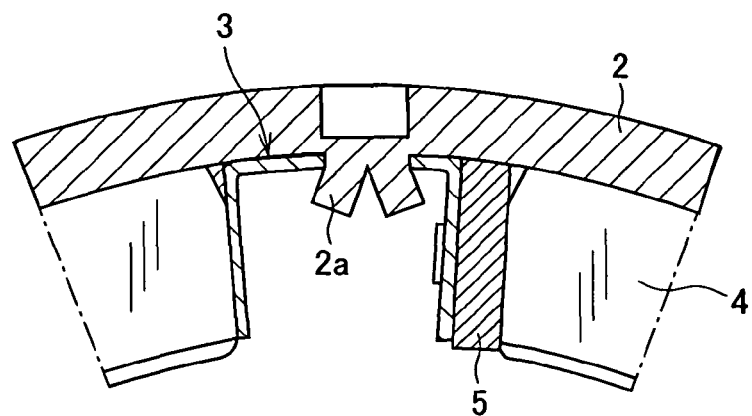
FIG. 7 shows a sectional view showing a method of fixing the sub-assembly to the yoke.

The sub-assy 6 is fixed to the inner circumference of the yoke 2 by positioning it in the axial and circumferential directions of the yoke 2 by inserting the two projection parts 2a provided on the yoke 2 into the two fixing holes 30a formed in the back-plate 30 of the magnet holding spring 3, and by split-and-caulking the projection part 2a, as shown in FIG. 7, along the axial direction.

Then, magneto insertion spaces are secured via a jig (not shown) between the adjoining sub-assys 6 in the circumferential direction, and the main magnetic poles 4 are inserted in the magneto insertion spaces from the axial direction.

The jig is taken out from the yoke 2 synchronizing with the inserting operation of the main magnetic poles 4.

Then, as shown in FIG. 1, by bending and extending the pairs of the nail-plate portion 33 provided in the magnet holding springs 3 to the main magnetic poles 4 sides, the position gaps in the axial direction of the main magnetic poles 4 are regulated, and the assembling is completed.

Since the yoke assembly 1 of the present embodiment should insert only the main magnetic poles 4 in the magneto insertion spaces after fixing the sub-assys 6 such that the magnet holding springs 3 and the auxiliary poles are integrated beforehand, the main magnetic poles 4 and the auxiliary poles 5 will not come apart during assembly, thus assembly becomes easier.

In addition, each sub-assy 6 is integrated with each auxiliary pole 5 in the deployed state of the plate-like shape before the magnet holding spring 3 is bent into the "]"-like sectional shape.

In this case, since it is not necessary to receive limitations in arrangement of the jig used for integrating the auxiliary pole 5 with the magnet holding spring 3, and to hold the magnet holding spring 3 to the "]"-like sectional shape, the integration of the magnet holding spring 3 and the auxiliary pole 5 can be performed easily compared with the case where the auxiliary pole 5 and the magnet holding spring 3 are integrated after bending and processing the magnet holding spring 3 into the "]"-like sectional shape.

Further, in the sub-assy 6 of the present embodiment, the auxiliary pole 5 is fixed to one of the side-plates 31 by press fitting the two fitting holes 31a formed in one of the side-plate 31 of the magnet holding spring 3 and the two convex parts 5a provided on the auxiliary pole 5.

However, as shown in FIG. 6, since formation of the convex part 5a on the auxiliary pole 5 and press fitting of the convex part 5a to the fitting hole 31a are performed simultaneously, one step of the processing process can be reduced compared with the case where the convex part 5a is press fit to the fitting hole 31a after forming the convex part 5a on the auxiliary pole 5.

Consequently, productivity improves and the sub-assy 6 can be realized with the lower cost.

In addition, since high accuracy in the diameter and relative positioning of the convex part 5a and the fitting hole 31a are not required by forming the convex part 5a on the auxiliary pole 5 and press fitting the convex part 5a to the fitting hole 31a simultaneously, the magnet holding spring 3 and the auxiliary pole 5 can be manufactured with the lower cost.

Further, when assembling the convex parts 5a to the auxiliary poles 5 and press fitting the convex parts 5a to the fitting holes 31a separately, and further providing a plurality of the convex parts 5a and fitting holes 31a, it is necessary to accurately set the distances between the convex parts 5a and between the fitting holes with high accuracy. However, according to the present embodiment, it is possible to reduce the cost further lower since such accurate positioning is not required.

The sub-assy 6 of the present embodiment is fixed to the yoke 2 by inserting the projection parts 2a provided in the yoke 2 into the fixing holes 30a formed in the back-plates 30 of the magnet holding springs 3 and split-and-caulking the projection part 2a along the axial direction.

The fixing method of this split-and-caulking can obtain the required fixing strength easily, is advantageous from a viewpoint of productivity and the fixing can be done with the reduced cost.

Compared with the general method of caulking that crushes the projection part 2a flat, the fixing method of split-and-caulking the projection part 2a along the axial direction, i.e. turning the edge of a blade of a punch that splits and caulks the projection part 2a in the axial direction can reduce the load when caulking.

At the same time, the caulking load acts on one point in the circumferential direction of the yoke 2, therefore the influence on the circularity of the yoke 2 can be reduced sharply, and damage to finished items can be reduced sharply.

Since the motor for starters of the present embodiment arranges the auxiliary pole 5 adjoining the increasing magnetic flux side of the main magnetic pole 4, the auxiliary pole 5 is needed to be arranged to the opposite side of the main magnetic pole 4 when changing the rotating direction of the armature.

If the fixing holes 30a formed in the back-plate 30 of the magnet holding spring 3 are arranged on the center of the back-plate 30 in the circumferential direction, it will be necessary to change the position of the projection part 2a formed on the yoke 2 when reversing the direction of the magnet holding spring 3 in the axial direction, therefore the yoke 2 cannot rotate in both directions.

On the other hand, since the fixing holes 30a formed in the back-plate 30 are arranged in the position offset just W/2 to the auxiliary pole 5 side from the center of the back-plate 30 in the circumferential direction in the present embodiment, since the position in the circumferential direction of the fixing holes 30a to the yoke 2 does not change even if the direction of the magnet holding spring 3 changes depending on the direction of rotation, the position of the projection parts 2a formed on the yoke 2 does not have to be changed, thus the yoke 2 can rotate in either direction.

In the sub-assy 6 of the present embodiment, since the back-plate 30 of the magnet holding spring 3 is fixed by caulking to the yoke 2, if the nail-plate portion 33 is bent and extended, the magnet holding spring 3 does not float to the inner diameter side of the yoke 2 according to the anti-power of the nail-plate portion 33 even if the nail-plate portion 33 is formed only on one side of the magnet holding spring 3.

Therefore, by forming the nail-plate portion 33 only on one side of the magnet holding spring 3, especially on the side where the other one of the side-plates 32 is provided, the costs of materials and molds of the magnet holding spring 3 can be reduced, thus the cost of the magnet holding spring 3 can be further lowered.

Incidentally, in the magnet holding spring 3 of the present embodiment, since the auxiliary pole 5 is fixed to one of the side-plates 31, the distance from the center of the fixing holes 30a to a tip of the side-plates 31 is shorter by the width W in the circumferential direction of the auxiliary pole 5 than the distance from the center of fixing holes 30a to a tip of the other one of the side-plates 32.

Figure 8:
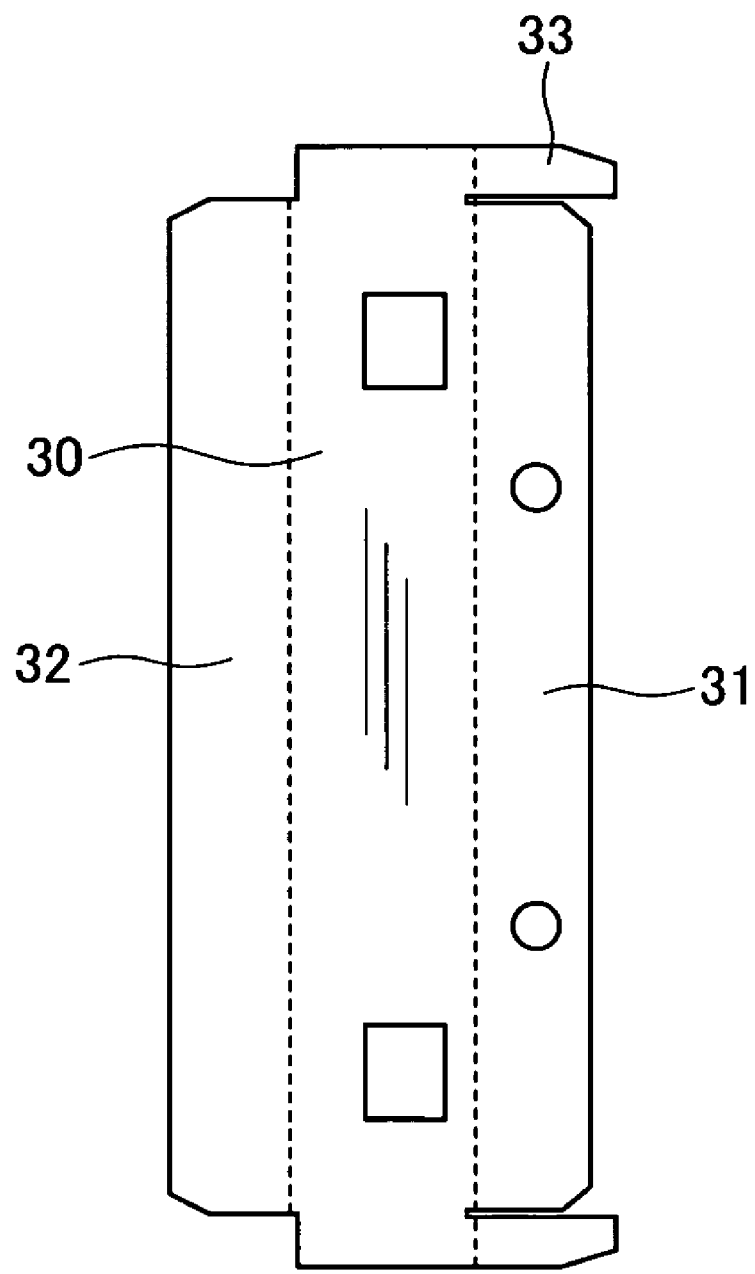
FIG. 8 shows a deployed view of the magnet holding spring.

For this reason, as shown in FIG. 8, when the nail-plate portion 33 is formed only in the side that has one of the side-plates 31, the tip of the nail plate 33 will project outwardly from the tip of one of the side-plate 31. Therefore, waste will arise into material if the material is cut according to the length of the nail plate 33.

On the other hand, when the nail-plate portion 33 is formed only in the side where the other one of the side-plates 32 is provided, the tip of the nail plate 33 will not project outwardly from the tip of the other one of the side-plates 32, as shown in FIG. 3, therefore the material can be used more effectively and waste of the material can be reduced.

Consequently, by forming the nail-plate portion 33 only in the side where the other one of the side-plates 32 is provided, the cost of materials for the magnet holding spring 3 can be cut, and compared with the case where the nail-plate portions 33 are formed in both sides of the magnet holding spring 3, the mold for bending the nail-plate portion 33 for one side can be abolished, thus the mold cost can be reduced.

What is claimed is:

1. A method of manufacturing a magneto field type motor including a plurality of main magnetic poles made of permanent magnets that are arranged to the inner circumference of a yoke at equal intervals; a plurality of auxiliary poles made of magnetic materials that are arranged to adjoin increasing magnetic flux sides of the main magnetic poles; a plurality of magnet holding springs that are arranged between the auxiliary poles and the decreasing magnetic flux sides of the main magnetic poles, wherein each magnet holding spring is provided in a "]"-like sectional shape having a back-plate fixed to an inner circumference of the yoke and a pair of side-plates extending in a direction of a center of the yoke from the both sides in a circumferential direction of the back-plate, the main magnetic poles and the auxiliary poles being fixed by being pressed in a circumferential direction by elasticity of the pair of the side-plates, in the stage where the magnet holding spring is deployed as a flat plate before the back-plate and the pair of side-plates are bent into the "]"-like sectional shape, the auxiliary pole is attached beforehand to one of the side-plates among the pair of side-plates, then the magnet holding spring is bent into the "]"-like sectional shape, the magnet holding spring and the auxiliary pole attached integrally to constitute a sub-assembly and the magnet holding spring and the auxiliary pole are attached interally by press fitting a concave part provided in either one of the side-plate or the auxiliary pole with a convex part provided in the other one of the side-plates or the auxiliary pole to form the sub-assembly, the method of manufacturing the magneto field type motor comprising:

forming a fitting hole that forms the concave part on one of the side-plates of the magnet holding spring by punching;

forming the convex part to the auxiliary pole in the position corresponding to the fitting hole by embossing; and assembling the magnet holding spring and the auxiliary pole integrally by press fitting the convex part into the fitting hole.

2. The method of manufacturing the magneto field type motor according to claim 1 further comprising the steps of:

forming the fitting hole beforehand on one of the side-plates before forming the convex part in the auxiliary pole of the magnet holding spring;

positioning one of the side-plates provided with the fitting hole and the auxiliary pole by laying the auxiliary pole on one of the side-plates; and forming the convex part to the auxiliary pole and press fitting the convex part to the fitting hole simultaneously by performing the punching process on the auxiliary pole in the state where the auxiliary pole and one of the side-plates are positioned so that the convex part is press fit into the fitting hole while the magnet holding spring and the auxiliary pole are integrally assembled simultaneously.

3. A magneto field type motor comprising:

a plurality of main magnetic poles made of permanent magnets that are arranged to the inner circumference of a yoke at equal intervals;

a plurality of auxiliary poles made of magnetic materials that are arranged to adjoining increasing magnetic flux sides of the main magnetic poles; and a plurality of magnet holding springs that are arranged between the auxiliary poles and the decreasing magnetic flux sides of the main magnetic poles;

wherein each magnet holding spring is provided in a "]"-like sectional shape having a back-plate fixed to an inner circumference of the yoke and a pair of side-plates extending in a direction of a center of the yoke from the both sides in a circumferential direction of the back-plate;

the main magnetic poles and the auxiliary poles are fixed by being pressed in a circumferential direction by elasticity of the pair of the side-plates;

in the stage where the magnet holding spring is deployed as a flat plate before the back plate and the pair of side-plates are bent into the "]"-like sectional shape, the auxiliary pole is attached beforehand to one of the side-plates among the pair of side-plates and then the magnet holding spring is bent into the "]"-like sectional shape;

the magnet holding spring and the auxiliary pole are attached integrally to constitute a sub-assembly;

a fixing hole is formed on the back-plate of the magnet holding spring that contacts the inner circumference of the yoke;

a projection portion is formed in the inner circumference of the yoke corresponding to the fixing hole;

the sub-assembly is fixed to the yoke by inserting the projection part into the fixing holes and split-and-caulking the projection part along an axial direction; and when the size of the auxiliary pole in the circumferential direction is set to W, the fixing hole is formed in the position offset just W/2 to the auxiliary pole side from the center of the back-plates in the circumferential direction.

4. The magneto field type motor according to claim 3, wherein, the magnet holding spring and the auxiliary pole are attached integrally by press fitting a concave part provided in either one of the side-plate or the auxiliary pole with a convex part provided in the other one of the side-plates or the auxiliary pole to form the sub-assembly.

5. A magneto field type motor comprising:

a plurality of main magnetic poles made of permanent magnets that are arranged to the inner circumference of a yoke at equal intervals;

a plurality of auxiliary poles made of magnetic materials that are arranged to adjoining increasing magnetic flux sides of the main magnetic poles; and a plurality of magnet holding springs that are arranged between the auxiliary poles and the decreasing magnetic flux sides of the main magnetic poles;

wherein each magnet holding spring is provided in a "]"-like sectional shape having a back-plate fixed to an inner circumference of the yoke and a pair of side-plates extending in a direction of a center of the yoke from the both sides in a circumferential direction of the back-plate;

the main magnetic poles and the auxiliary poles are fixed by being pressed in a circumferential direction by elasticity of the pair of side-plates;

in the stage where the magnet holding spring is deployed as a flat plate before the back-plate and the pair of side-plates are bent into the "]"-like sectional shape, the auxiliary pole is attached beforehand to one of the side-plates among the pair of side-plates and then the magnet holding spring is bent into the "]"-like sectional shape;

the magnet holding spring and the auxiliary pole are attached integrally to constitute a sub-assembly;

a fixing hole is formed on the back-plate of the magnet holding spring that contacts the inner circumference of the yoke;

a projection portion is formed in the inner circumference of the yoke corresponding to the fixing hole;

the sub-assembly is fixed to the yoke by inserting the projection part into the fixing holes and split-and-caulking the projection part along an axial direction;

a nail-plate portion that regulates position gaps of the main magnetic poles in the axial direction is formed on both ends of the magnet holding spring in the axial direction; and the nail-plate portion is formed only on the side that has the other one of the side-plates among the pair of the side-plates in the circumferential direction of the magnet holding spring.

* * * * *